US009585072B1

(12) United States Patent
Liu et al.

(10) Patent No.: US 9,585,072 B1
(45) Date of Patent: Feb. 28, 2017

(54) SCELL TRIGGERED HANDOVER NOTWITHSTANDING GOOD PCELL CONDITION (71) Applicant: Sprint Spectrum L.P., Overland Park, KS (US)

(72) Inventors: Chunmei Liu, Great Falls, VA (US); Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/805,849

(22) Filed: Jul. 22, 2015

(51) Int. Cl.
| H04W 36/14 | (2009.01) |
| H04W 36/30 | (2009.01) |
| H04W 36/00 | (2009.01) |
| H04W 36/32 | (2009.01) |
| H04W 4/02 | (2009.01) |
| H04L 5/00 | (2006.01) |
| H04L 5/14 | (2006.01) |
| H04W 36/04 | (2009.01) |
| H04W 88/08 | (2009.01) |

(52) U.S. Cl.
CPC ........... *H04W 36/14* (2013.01); *H04L 5/0057* (2013.01); *H04L 5/14* (2013.01); *H04W 4/02* (2013.01); *H04W 36/0088* (2013.01); *H04W 36/04* (2013.01); *H04W 36/30* (2013.01); *H04W 36/32* (2013.01); *H04W 88/08* (2013.01)

(58) Field of Classification Search
CPC ..... H04W 36/14; H04W 36/04; H04W 36/32; H04W 36/30; H04W 4/02; H04W 36/0088; H04W 88/08; H04L 5/0057; H04L 5/14
See application file for complete search history.

(56) References Cited

U.S. PATENT DOCUMENTS

| 2012/0076021 | A1* | 3/2012 | Sambhwani | H04W 36/0072 370/252 |
| 2012/0214540 | A1* | 8/2012 | Narasimha | H04W 36/30 455/525 |
| 2012/0243429 | A1* | 9/2012 | Nakamori | H04L 5/001 370/252 |
| 2013/0150054 | A1* | 6/2013 | Axmon | H04W 36/32 455/440 |
| 2016/0135089 | A1* | 5/2016 | Catovic | H04W 28/085 370/331 |

\* cited by examiner

*Primary Examiner* — Chuong A Ngo (57) ABSTRACT

Disclosed are methods and systems to facilitate handover of a UE away from a primary carrier of a base station, despite a primary carrier having a channel quality that is at or above a channel quality threshold of the primary carrier. In particular, a wireless communication system may serve the UE with carrier aggregation service using (i) a first carrier as a primary carrier for the UE and (ii) a second carrier as a secondary carrier for the UE. During the serving, while a channel quality of the primary carrier is at or above a first threshold quality, the system may make a determination that a channel quality of the secondary carrier is below a second threshold quality. In response to at least making the determination, the system may carry out a handover of the UE from the primary carrier of the first base station to another carrier.

12 Claims, 5 Drawing Sheets

SCELL TRIGGERED HANDOVER NOTWITHSTANDING GOOD PCELL CONDITION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

Depending on the air interface protocol and other factors, a coverage area may operate using a frequency division duplex (FDD) arrangement or may operate using a time division duplex (TDD) arrangement. In an FDD arrangement, different carrier frequencies or ranges of frequency are used for the downlink than for the uplink. With this FDD arrangement, an FDD carrier may therefore include a pair of frequency channels with a first channel being used for downlink communication and a second channel being used for uplink communication. Whereas, in a TDD arrangement, the same carrier frequency or range of frequency is used for the downlink and uplink and is allocated over time among downlink and uplink communications. With this TDD arrangement, a TDD carrier may therefore include a single frequency channel divided over time into segments for downlink communication and other segments for uplink communication. A recent version of the LTE standard of the Universal Mobile Telecommunications System (UMTS) supports both the TDD arrangement and the FDD arrangement.

Furthermore, in accordance with the recent version of the LTE standard, each coverage area of a base station may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. The air interface is then divided over time into a continuum of 10-millisecond frames, with each frame being further divided into ten 1-millisecond subframes or transmission time intervals (TTIs) that are in turn each divided into two 0.5-millisecond segments. And each 0.5 millisecond segment or in each 1 millisecond TTI, the air interface is then considered to define a number of 12-subcarrier wide "resource blocks" cooperatively spanning the frequency bandwidth (i.e., as many as would fit in the given frequency bandwidth). In addition, each resource block is divided over time into symbol segments of 67 µs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. With this arrangement, when a UE is attached with a base station on a particular carrier, the base station provides DCIs to the UE on the PDCCH of that particular carrier and schedules downlink communication of bearer data to the UE on the PDSCH of that particular carrier. Moreover, LTE also supports uplink control signaling on the PUCCH using uplink control information (UCI) messages. UCI messages can carry scheduling requests from UEs, requesting the base station to allocate PUSCH resource blocks for uplink bearer data communication.

In another arrangement, a revision of LTE known as LTE-Advanced may permit a base station to serve a UE with "carrier aggregation," by which the base station schedules bearer communication with a UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers.

When carriers are aggregated, each carrier may be referred to as a component carrier. Of the component carriers, one may be deemed a primary component carrier or primary cell (PCell) on which the base station serves the UE, and each other component carrier may be deemed to be a secondary component carrier or secondary cell (SCell) on which the base station serves the UE. In particular, the primary carrier may be the carrier on which the UE is attached with the serving base station and may thus carry control signaling (such as scheduling requests and DCI messages) between the base station and the UE, in addition to carrying scheduled data transmissions between the base station and the UE. Each added secondary carrier may then function to increase the total bandwidth on which the base station serves the UE with scheduled data transmissions.

Generally, in order to change a primary carrier on which the base station serves the UE, the serving base station may engage in handover processing. This may specifically involve detaching the UE from the primary carrier on which the UE is attached with the serving base station and then engaging in signaling by which the UE would register to be served (e.g., by the same base station or by a different base station) on a new primary carrier. Whereas, in order to change a secondary carrier on which the base station serves the UE, the serving base station may simply remove the secondary carrier from the carrier aggregation service and may add a new secondary carrier to the carrier aggregation service without engaging in handover processing.

Overview

A wireless communication system may serve a UE over an air interface connection between the UE and a first base station. In doing so, the wireless communication system may serve the UE with carrier aggregation service using a first carrier as a primary carrier for the UE while using a second carrier as a secondary carrier for the UE. With this arrangement, the wireless communication system may maintain a channel quality threshold for the primary carrier (e.g., established via manual engineering input). When the wireless communication system determines that a channel quality of the primary carrier is below the channel quality threshold for the primary carrier, the wireless communication system may responsively cause the UE to begin scanning for other coverage so as to possibly trigger handover of the UE to another carrier. This handover may specifically involve the wireless communication system handing over the UE from the UE's current primary carrier to a different carrier of the first base station such that this different carrier then serves as a new primary carrier for the UE. Alternatively, this handover may involve the wireless communication system handing over the UE from the first base station to a second base station and then serving the UE over a new air interface connection between the UE and the second base station.

Additionally, the wireless communication system could also maintain a channel quality threshold for the secondary carrier (e.g., established via manual engineering input). Generally, when the wireless communication system determines that a channel quality of the secondary carrier is below the channel quality threshold for the secondary carrier (e.g., a threshold poor channel quality), the wireless communication system may responsively seek to stop serving the UE using the second carrier as the secondary carrier for the UE. In doing so, the wireless communication system may attempt to replace the second carrier with a different carrier of the first base station as the secondary carrier for the UE. Additionally or alternatively, the wireless communication system could attempt to add a different carrier of the first base station as another secondary carrier in the carrier aggregation service so as to provide for additional bandwidth.

In some cases, the wireless communication system may attempt to add one or more such different carriers to the carrier aggregation service but may determine that these different carriers are not available for use as secondary carriers in the carrier aggregation service provided to the UE. By way of example, the different carriers may not be available for use due to limited available resources on these different carriers and/or may not be available for use due to other reasons. Given that these different carriers are not available and that the UE may still need the bandwidth provided by the second carrier, the wireless communication system may make a decision to continue providing carrier aggregation service to the UE using the second carrier as a secondary carrier despite the second carrier having a threshold poor channel quality.

Furthermore, as the wireless communication system continues to provide carrier aggregation service to the UE while the second carrier has a threshold poor channel quality, the channel quality of the primary carrier may be threshold good, such as by being above the channel quality threshold for the primary carrier for instance. And since the channel quality of the primary carrier is threshold good, the wireless communication system may not trigger handover of the UE. Hence, even though the channel quality of the secondary carrier is threshold poor, the wireless communication system may maintain the established carrier aggregation service by continuing to use the first carrier as the primary carrier for the UE as well as continuing to use the second carrier as the secondary carrier for the UE.

Unfortunately, however, maintaining the established carrier aggregation service while the channel quality of the secondary carrier is threshold poor could result in various issues. For instance, the UE may end up using designated resources on the second carrier while the channel quality of the second carrier is threshold poor, thereby potentially leading to the UE experiencing a relatively poor quality of service. Moreover, since the UE at issue is using designated resources on the second carrier, the UE may end up consuming resources of the second carrier that could otherwise be used by other UEs connected to the wireless communication system. Hence, maintaining the established carrier aggregation service while the channel quality of the secondary carrier is threshold poor may result in the UE experiencing a relatively poor quality of service while unnecessarily draining network resources provided by the second carrier, among other possible issues.

Disclosed herein is an arrangement to help overcome problems that result from maintaining the established carrier aggregation service while the channel quality of the secondary carrier is threshold poor. In accordance with the disclosure, the wireless communication system may serve the UE, over an air interface connection between the UE and the first base station, with carrier aggregation service using the first carrier as the primary carrier for the UE while using the second carrier as the secondary carrier for the UE. During the serving, while a channel quality of the primary carrier is at or above the channel quality threshold for the primary carrier, the wireless communication system may make a determination that the channel quality of the secondary carrier is below the channel quality threshold for the secondary carrier. Responsive to this determination, the wireless communication system may carry out a handover of the UE from the primary carrier of first base station to a different carrier (e.g., of the second base station), even though the channel quality of the primary carrier is at or above the channel quality threshold for the primary carrier.

In this manner, the wireless communication system may trigger handover of the UE despite the primary carrier having a channel quality that is at or above the channel quality threshold of the primary carrier. This approach may therefore free up network resources for use by other UEs connected to the wireless communication system. Also, this approach may benefit the UE at issue, as the UE would no longer receive a relatively poor quality of service via the second carrier of the first base station. Of course, other advantages are also possible.

Accordingly, disclosed herein is a method operable in a wireless communication system including a first base station having an established radio-link-layer connection with a UE. The radio-link-layer connection may encompass a first carrier and a second carrier and the first base station may be configured to provide the UE with carrier aggregation service using the first and second carriers. In accordance with the method, the first base station may serve the UE with the carrier aggregation service using (i) the first carrier as a primary carrier for the UE and (ii) the second carrier as a secondary carrier for the UE. During the serving, while a channel quality of the primary carrier is at or above a first threshold quality, the first base station may make a determination that a channel quality of the secondary carrier is below a second threshold quality. In response to at least making the determination, the wireless communication system may carry out a handover of the UE from the primary carrier of the first base station to a different carrier, even though the channel quality of the primary carrier is at or above the first threshold quality.

Additionally, disclosed herein is a method operable in a wireless communication system including first and second base stations (e.g., first and second base stations). The first base station may have an established radio-link-layer connection with a UE and the radio-link-layer connection may encompass a first carrier and a second carrier. This first base station may be configured to provide the UE with carrier aggregation service using the first and second carriers. In accordance with the method, the wireless communication system may serve the UE with the carrier aggregation service using (i) the first carrier as a PCell for the UE and (ii) the second carrier as SCell for the UE. During the serving, while a channel quality of the PCell is at or above a designated PCell threshold quality (e.g., below which the first base station may responsively cause the UE to begin scanning for other coverage so as to possibly trigger handover of the UE to another PCell), the wireless communication system may make a determination that a channel quality of the SCell is below a designated SCell threshold quality. In response to at least making the determination, the wireless communication system may carry out a handover of the UE from the PCell of the first base station to a different cell of the second base station, even though the channel quality of the PCell is at or above the designated PCell threshold quality.

Further, disclosed herein is a wireless communication system including a first base station, a second base station, and a controller configured to perform operations. The operations may involve configuring carrier aggregation service for a UE over a radio-link-layer connection between the first base station and the UE. Configuring the carrier aggregation service may involve transmitting from the first base station to the UE at least one radio-link control message designating a first carrier as a PCell in the carrier aggregation service and designating a second carrier as one of at least one SCell in the carrier aggregation service. The operations may also involve serving the UE with the configured carrier aggregation service over the radio-link-layer connection. The operations additionally involve, during the serving, while a channel quality of the PCell is at or above a first threshold quality, making a determination that a channel quality of the one of the at least one SCell is below a second threshold quality. The operations may then further involve, in response to at least making the determination, invoking a handover of the UE from the PCell of the first base station to a different cell of the second base station, even though the channel quality of the PCell is at or above the first threshold quality.

Yet further, in another respect, disclosed is a non-transitory computer-readable medium having stored thereon instructions executable by a processor to cause a wireless communication system to carry out functions such as those noted above, to facilitate handover of the UE despite the primary carrier having a channel quality that is at or above the channel quality threshold of the primary carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
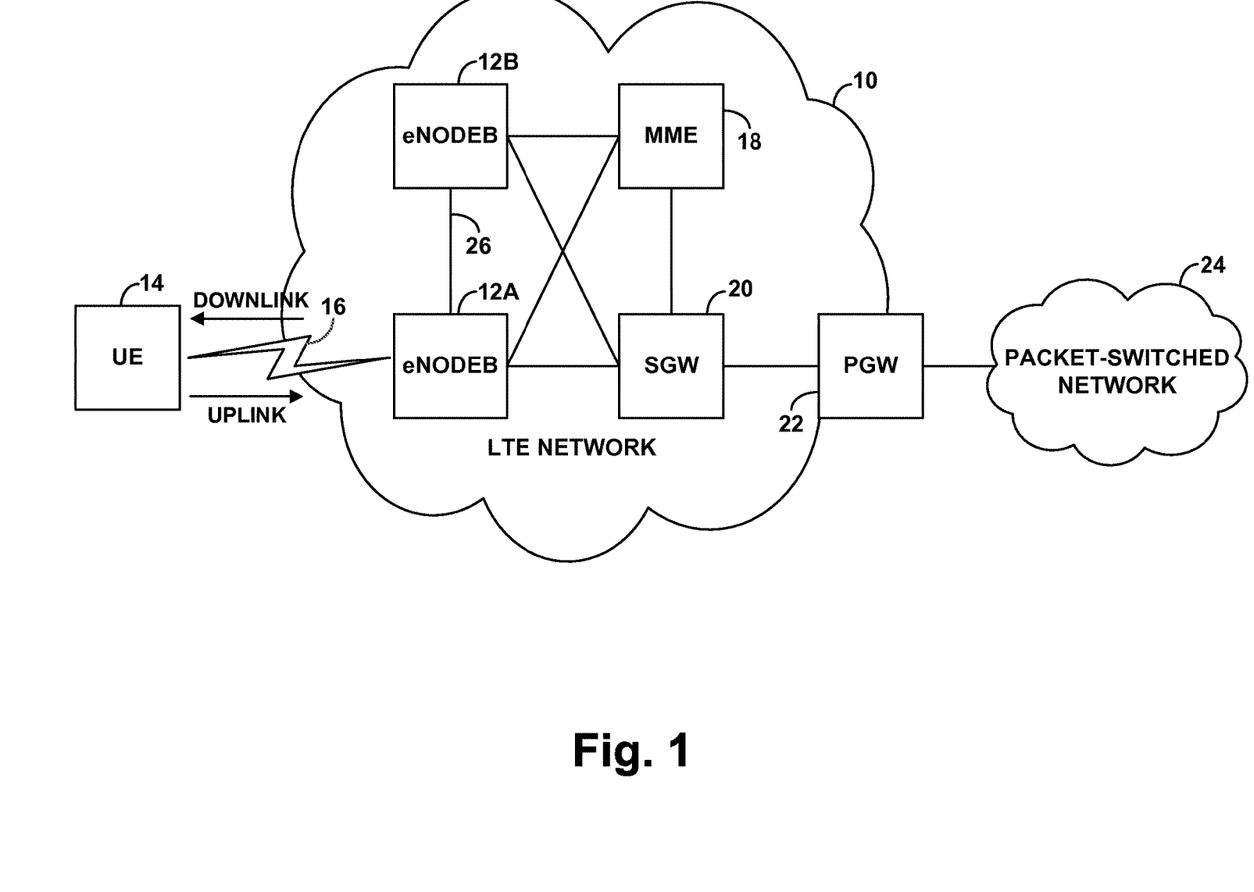
FIG. 1 is a simplified block diagram of a wireless communication system in which the present method can be implemented.

Referring to the drawings, as noted above, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes example LTE macro base stations 12A-12B known as eNodeBs. Each such eNodeB has an antenna structure and associated equipment for providing an LTE coverage area in which to serve UEs such as an example UE 14. For instance, eNodeB 12A radiates to provide a coverage area defining a wireless air interface 16 through which the eNodeB 12A may communicate with one or more served UEs, such as UE 14, via the downlink and the uplink.

As shown in FIG. 1, eNodeBs 12A-12B each have a communication interface with a Mobility Management Entity (MME) 18. The MME 18 can function as a signaling controller for the LTE network 10. Further, eNodeBs 12A-12B each have a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeBs 12A-12B are each communicatively linked with a core network, which is operated by a wireless service provider. The core network then provides connectivity with one or more MMEs, such as MME 18, as well as one or more gateways such as SGW 20 and PGW 22.

In practice, eNodeB 12A and eNodeB 12B may also engage in signaling communication with each other. In particular, eNodeB 12A and eNodeB 12B may communicate with each other over an inter-eNodeB "X2" interface 26, which may pass through the core network or over a more direct physical connection between the eNodeB 12A and the eNodeB 12B. Other example arrangements may also be possible.

Figure 2:
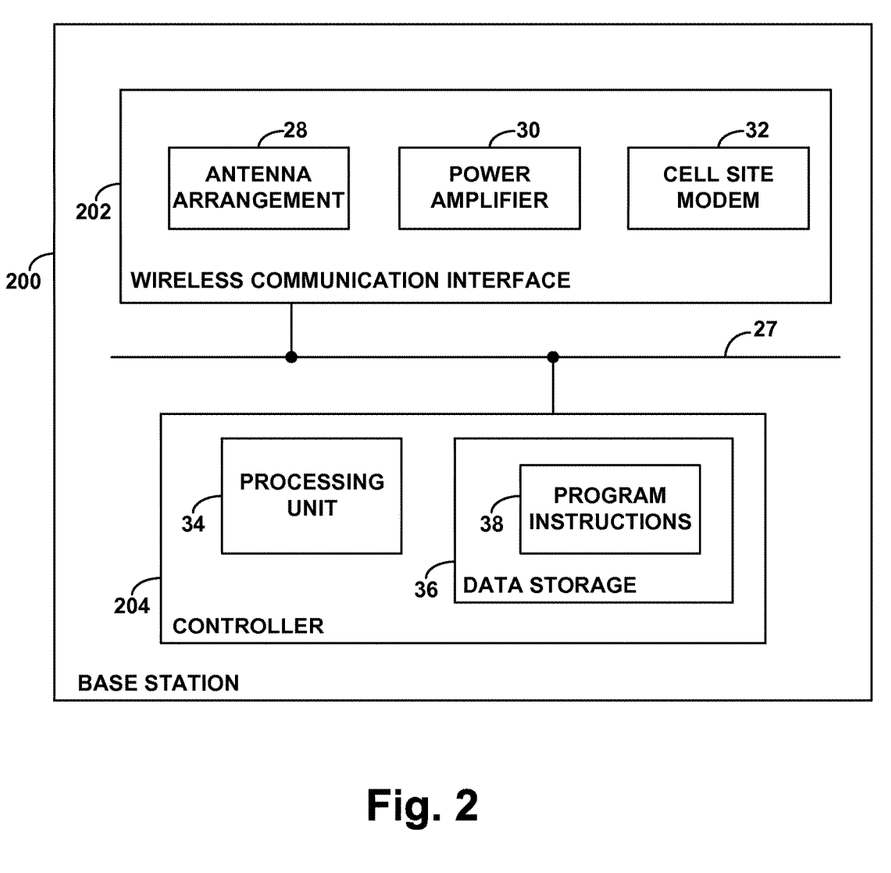
FIG. 2 is a simplified block diagram of a base station in which the present method can be implemented.

FIG. 2 is next a simplified block diagram of a representative base station 200 such as eNodeB 12A or eNodeB 12B, illustrating some of the components that can be included in such an entity. As shown in FIG. 2, the representative base station 200 may include a wireless communication interface 202 and a controller 204. Additionally, these components of the base station 200 may be communicatively linked together by a system bus, network, or other connection mechanism 27. Alternatively, they may be integrated together in various ways.

As shown, wireless communication interface 202 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 204 may include processing unit 34 and data storage 36 and is arranged to manage or carry out various functions such as those discussed herein.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (e.g., have encoded thereon) program instructions 38, which may be executable by processing unit 34 to carry out various controller functions. As such, the processing unit 34 programmed with instructions 38 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

Moreover, base station 200 in a wireless communication system can take various forms. For instance, the base station 200 could be a macro base station operated by a wireless carrier to provide a broad range of coverage and may thus include a tall antenna tower and a power amplifier for providing high transmission power. Alternatively, the base station 200 could be a small cell base station ("small cell"), such as a femtocell, typically having a much smaller form factor and operating at lower transmission power for providing a smaller range of coverage. Other forms are also possible.

Figure 3:
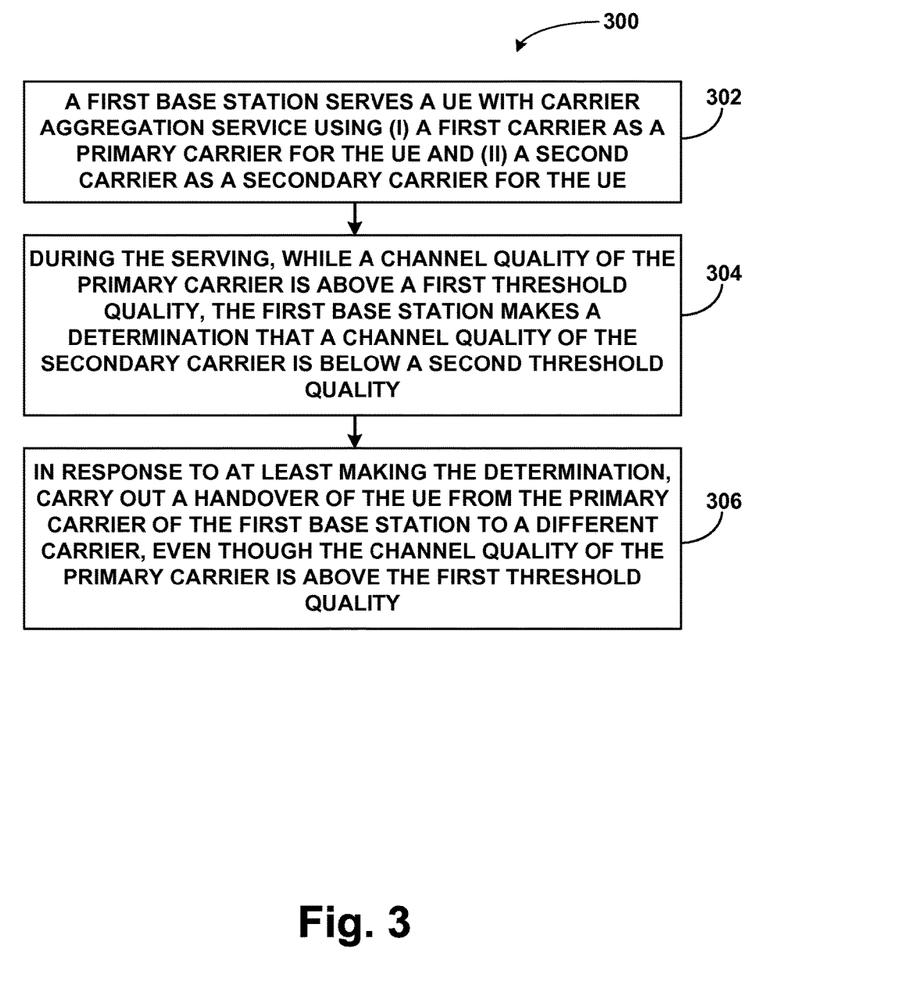
FIG. 3 is a flowchart illustrating a method to facilitate handover of a UE despite a primary carrier having a channel quality that is at or above a channel quality threshold of the primary carrier, in accordance with an example embodiment.

FIG. 3 is a flowchart illustrating a method 300, according to an example embodiment. Illustrative methods, such as method 300, may be carried out in whole or in part by component(s) and/or arrangement(s) in a wireless communication system, such as by the one or more of the components of the representative LTE network 10 shown in FIG. 1 and/or with one or more of the components of the base station 200 shown in FIG. 2. However, it should be understood that example methods, such as method 300, may be carried out by other entities or combinations of entities as well as in other arrangements, without departing from the scope of the disclosure.

In particular, method 300 may be operable in a wireless communication system including a first base station (e.g., eNodeB 12A) having an established radio-link-layer connection (e.g., over air interface 16) with a UE (e.g., UE 14). This radio-link-layer connection may encompass a first carrier and a second carrier. With this arrangement, the first base station may be configured to provide the UE with carrier aggregation service using the first and second carriers. Accordingly, as shown by block 302 in FIG. 3, method 300 involves serving the UE, by the first base station, with the carrier aggregation service using (i) the first carrier as a primary carrier for the UE and (ii) the second carrier as a secondary carrier for the UE. At block 304, method 300 then involves, during the serving, while a channel quality of the primary carrier is at or above a first threshold quality, the first base station making a determination that a channel quality of the secondary carrier is below a second threshold quality. At block 306, method 300 then involves, in response to at least making the determination, carrying out a handover of the UE from the primary carrier of the first base station to a different carrier (e.g., a carrier of eNodeB 12B or a carrier of a small cell), even though the channel quality of the primary carrier is at or above the first threshold quality.

As noted above, the present disclosure provides for a process that is used to facilitate handover of the UE despite the primary carrier having a channel quality that is at or above the channel quality threshold of the primary carrier. This process could be carried out by eNodeB 12A itself and/or by one or more other network entities, such as with portions of the analysis carried out by an entity outside of the eNodeB 12A (e.g., MME 18) and the eNodeB 12A then responsively working to direct handover of the UE 14. For simplicity, however, the process will be described here in a scenario where the eNodeB 12A carries out all aspects of the process.

Referring again to FIG. 1, we may assume by way of example (and without limitation) that UE 14 is attached with eNodeB 12A (e.g., attached on the first carrier) and is thus being served with wireless communication service by eNodeB 12A. As such, we may assume that the UE 14 has worked with eNodeB 12A to establish a Radio Resource Control (RRC) connection defining a radio-link-layer connection between the UE 14 and the eNodeB 12A, and that at least one logical bearer has been established between the UE 14 and the PGW 22, with the bearer including a radio portion extending between the UE 14 and the eNodeB 12A and an access portion extending between the eNodeB 12A and the PGW 22 via the SGW 20. Further, we may assume that, as the UE 14 is served by eNodeB 12A, the UE 14 regularly monitors a downlink reference signal from eNodeB 12A and from each other eNodeB that the UE 14 can detect, such as eNodeB 12B for instance As the eNodeB 12A serves the UE 14, the eNodeB 12A may configure carrier aggregation service for the UE 14 over the radio-link-layer connection between the eNodeB 12A and the UE 14. The eNodeB 12A may do so by transmitting to the UE 14 a radio-link control message designating the first carrier as a primary carrier in the carrier aggregation service and designating the second carrier as one of at least one secondary carrier in the carrier aggregation service. In particular, the radio-link control message may identify the UE 14 (e.g., using a Globally Unique Temporary ID (GUTI)) and may direct the UE 14 to operate on a set of one or more carriers (e.g., the first and second carriers). Moreover, the radio-link control message may identify the particular carriers in the set of one or more carriers, such as by specifying a global identifier of each respective carrier for instance. Further, the radio-link control message may designate one such carrier by a special primary carrier index (also referred to as a PCell index) and may designate each other carrier by a special secondary carrier index (also referred to as an SCell index). By standard, an index of 0 (zero) is the index used to identify the primary carrier for the UE 14 and any of 1 to 7 are used as an index respectively to identify each secondary carrier for the UE 14. After receiving the radio-link control message, the UE 14 may then be set to monitor transmissions on the designated set of one or more carriers.

In an example implementation, the eNodeB 12A may maintain a first threshold quality that is associated with the primary carrier and may also maintain a second threshold quality that is associated with the secondary carrier. In particular, these thresholds may be set by engineering design, such as with consideration of what is considered as inadequate channel quality. Further, the first threshold quality may be the same as the second threshold quality. Alternatively, the first threshold quality may be different from the second threshold quality. In either case, a threshold quality may define a measure for quality of service experienced by the UE 14 (e.g., via a carrier) below which the UE 14 may experience delays in transmission of content and/or lack of continuity in a provided service, among other possible interruptions. This measure could be defined in one of various ways.

By way of example, a measure of channel quality may be a Channel Quality Indicator (CQI) received by the eNodeB 12A via a CQI report from the UE 14. In particular, a CQI report may include a value (e.g., 0-15) representing the UE's channel quality, where higher values correspond with a higher channel quality and lower values correspond with a lower channel quality. With this arrangement, the eNodeB 12A may receive from the UE 14 (e.g., continuously or from time-to-time) a plurality of CQIs each specifying a quality of at least one communication channel between the eNodeB 12A and the UE 14. In this example, the eNodeB 12A could then use as the measure of threshold quality a particular CQI value or an average (or other indication) of recent such repeated CQI values.

For instance, the eNodeB 12A could maintain the measure of threshold quality in the form of a CQI level of 7 (e.g., established via manual engineering input). In this instance, if the eNodeB 12A determines that a particular carrier has an associated CQI level (e.g., a CQI level of 9) that is at or above the measure of threshold quality, the eNodeB 12A could interpret this as the particular carrier providing sufficient quality of service to the UE 14. Whereas, if the eNodeB 12A determines that a particular carrier has an associated CQI level (e.g., a CQI level of 4) that is below the measure of threshold quality, the eNodeB 12A could interpret this as the particular carrier providing to the UE 14 an insufficient quality of service that could lead to the above-mentioned interruptions. As such, the eNodeB 12A could use CQIs (or other measures) as a basis for determining channel quality of the first and/or second carriers as well as for determining when such determined channel quality is at or above or below a threshold channel quality.

As noted above, as the eNodeB 12A serves the UE 14, the eNodeB 12A may make a determination that the channel quality of the secondary carrier is below the second threshold quality. The eNodeB 12A may make this determination while the channel quality of the primary carrier is at or above the first threshold quality. In one case, the channel quality of the primary carrier may be at or above the first threshold quality but the eNodeB 12A may not actively determine that the channel quality of the primary carrier is actually at or above the first threshold quality. That is, the eNodeB 12A may only make a determination that the channel quality of the secondary carrier is below the second threshold quality while the UE 14 experiences via the primary carrier a channel quality that is at or above the first threshold quality. In this case, in response to making the determination that the channel quality of the secondary carrier is below the second threshold quality, the eNodeB 12A may carry out a handover of the UE 14 from the primary carrier of the eNodeB 12A to another carrier, such as to another carrier of eNodeB 12A or to another carrier of eNodeB 12B (e.g., this other carrier of eNodeB 12B could be the same carrier as the primary carrier of eNodeB 12A). As noted, the eNodeB 12A may do so despite the channel quality of the primary carrier being above the first threshold quality.

In another case, the eNodeB 12A may actively determine the channel quality of the primary carrier and may thus determine both (i) that the channel quality of the primary carrier is at or above the first threshold quality and (ii) that the channel quality of the secondary carrier is below the second threshold quality. In this case, in response to determining both (i) that the channel quality of the primary carrier is at or above the first threshold quality and (ii) that the channel quality of the secondary carrier is below the second threshold quality, the eNodeB 12A may carry out a handover of the UE 14 from the primary carrier of eNodeB 12A to another carrier.

In some cases, the eNodeB 12A may also consider other factors as part of making a decision to carry out the handover of the UE 14 from the primary carrier of eNodeB 12A to another carrier, such as to another carrier of eNodeB 12B. For instance, the eNodeB 12A may determine that the eNodeB 12B is within a threshold distance away from the UE 14 or is otherwise sufficiently close to the UE 14. In particular, the eNodeB 12A may do so to ensure that the eNodeB 12B can provide sufficient coverage to the UE 14 after the handover. Moreover, the eNodeB 12A may determine in one of various ways that the eNodeB 12B is within a threshold distance away from the UE 14 or is otherwise sufficiently close to the UE 14. For example, as the eNodeB 12A serves the UE 14, the eNodeB 12A may receive from the UE 14 (e.g., continuously or from time-to-time) a plurality of signal strength reports. Each such report may indicate downlink signal strength detected by the UE 14 for each of one or more eNodeBs. In this example, the eNodeB 12A may refer to at least one such report (e.g., a report indicating signal strength of eNodeB 12B) and may use this report to determine that the eNodeB 12B is capable of providing sufficiently strong downlink signals to the UE 14, such as by determining that the downlink signal strength of the eNodeB 12B is at or above a threshold signal strength. Determining that eNodeB 12B can provide to the UE 14 sufficiently strong downlink signals may serve as an indication to the eNodeB 12A that the eNodeB 12B is sufficiently close to the UE 14.

In another example, the eNodeB 12A may include (or may otherwise refer to) data storage containing information that specifies respective locations of one or more eNodeBs. With this arrangement, the eNodeB 12A may determine location of the eNodeB 12B by referring to this information. Additionally, the eNodeB 12A may also determine location of the UE 14, for instance, based on Global Positioning System (GPS) data received from the UE 14, but may also do so in any way currently known or developed in the future. The eNodeB 12A may then use the determined location of the UE 14 and the determined location of the eNodeB 12B as a basis for determining a distance between the UE 14 and the eNodeB 12B. Once the eNodeB 12A determines the distance between the UE 14 and the eNodeB 12B, the eNodeB 12A may then determine that the determined distance between the UE 14 and the eNodeB 12B is within the above-mentioned threshold distance. Other examples are also possible.

With this variation, once the eNodeB 12A determines, while the channel quality of the primary carrier is threshold good, that the channel quality of the secondary carrier is threshold poor and perhaps also considers the other factors as discussed above, the eNodeB 12A may then carry out the handover of the UE 14 from the primary carrier of the eNodeB 12A to a different carrier that would then serve as the primary carrier of the UE 14, such as to the same or a different carrier of eNodeB 12B. This handover processing could take various forms. For instance, when the UE 14 is operating in an idle mode, the handover process may involve the UE 14 simply transitioning from operating in the idle mode in one coverage area to operating in the idle mode in another coverage area, such as by operating in the idle mode while being served on the same or a different carrier of eNodeB 12B. In this case, the UE 14 may also possibly signal to notify the wireless communication system (e.g., via eNodeB 12B) of the UE's new coverage area.

Whereas, when the UE 14 is operating in an active/connected mode, the handover process may involve signaling between the UE 14 and the wireless communication system (e.g., via eNodeB 12A) to facilitate transferring of the UE's connection from one coverage area to another coverage area, such as by signaling to detach the UE 14 from the primary carrier of eNodeB 12A and then signaling to attach the UE 14 to another carrier. Moreover, under LTE, the source eNodeB 12A may transmit a handover request via the X2 interface 26 to the target eNodeB 12B in order to prepare the target eNodeB 12B to receive handover of the UE 14. Other handover processing techniques are also possible.

In a further aspect, the present disclosure may apply in a situation when the first carrier is an FDD carrier defining separate frequency channels respectively for uplink and downlink communication and when the second carrier is a TDD carrier defining a single frequency channel multiplexed over time for uplink and downlink communication. According to some standards, FDD carriers may operate on lower frequencies relative to frequencies on which TDD carriers operates. Such lower frequencies may generally lead to transmissions having a relatively lower path loss compared to transmissions on higher frequencies. This lower path loss may then result in transmissions that are received with relatively higher signal strength. Whereas, a higher path loss may result in transmissions that are received with relatively lower signal strength As a result of such standards, location of the UE 14 may sometimes not allow the eNodeB 12A to receive from the UE 14 uplink TDD transmissions with sufficiently high signal strength. When the UE 14 is at such a location within the coverage area of the eNodeB 12A, the uplink transmission capabilities of the TDD carrier may effectively no longer exist and the eNodeB 12A may thus be capable of carrying out (i) uplink and downlink communication on the FDD carrier and (ii) only downlink communication on the TDD carrier. As such, while the channel quality of the primary carrier is threshold good, the eNodeB 12A could determine that the UE 14 is at such a location within the coverage area and that this location allows the eNodeB 12A to carry out (i) uplink and downlink communication on the FDD carrier and (ii) only downlink communication on the TDD carrier.

When the eNodeB 12A carries out (i) uplink and downlink communication on the FDD carrier and (ii) only downlink communication on the TDD carrier, the location of the UE 14 could perhaps still allow for downlink TDD transmissions. However, due to the location of the UE 14, these downlink TDD transmissions may be received by the UE 14 with relatively low signal strength. So while the downlink transmission capabilities of the TDD carrier may effectively still exist when the UE 14 is at such a location, the downlink transmissions on the TDD carrier may experience a threshold poor channel quality, such as a channel quality that is below the above-mentioned second threshold quality. To avoid the TDD carrier experiencing such a threshold poor channel quality, the eNodeB 12A may thus carry out handover of the UE 14 in response to the eNodeB 12A determining that the UE 14 is at a location that leads to the eNodeB 12A carrying out (i) uplink and downlink communication on the FDD carrier and (ii) only downlink communication on the TDD carrier. As noted, the eNodeB 12A may carry out this handover despite the channel quality of the FDD carrier (i.e., the primary carrier) being threshold good.

Further, carrying out this handover could sometimes involve directing the UE 14 to remain connected to the eNodeB 12B following the handover and to do so until the UE 14 encounters one or more triggers. In one example, while the UE 14 is connected to the eNodeB 12B, the UE 14 may determine that it is no longer at the location that would lead to only downlink communication on the TDD carrier of the eNodeB 12A if the UE 14 was still connected to the eNodeB 12A. If the UE 14 makes this determination, this may serve as a trigger to the UE 14 that the UE 14 no longer has to remain connected to the eNodeB 12B and could thus hand over to another eNodeB, such as back to eNodeB 12A for instance. Otherwise, the UE 14 may remain connected to the eNodeB 12B until the UE 14 is no longer at this location. In this example, the UE 14 may thus not attempt to hand over from the eNodeB 12B back to the eNodeB 12A as long as the UE 14 is at this location.

In another example, the trigger may involve the location of the UE 14 no longer being within the respective coverage area of the eNodeB 12B. Hence, the UE 14 may remain connected to the eNodeB 12B until the UE 14 is no longer within the respective coverage area of the eNodeB 12B. In this example, the UE 14 may thus not attempt to hand over from the eNodeB 12B back to the eNodeB 12A as long as the UE 14 is within the respective coverage area of the eNodeB 12B. Other examples are also possible.

Figure 4:
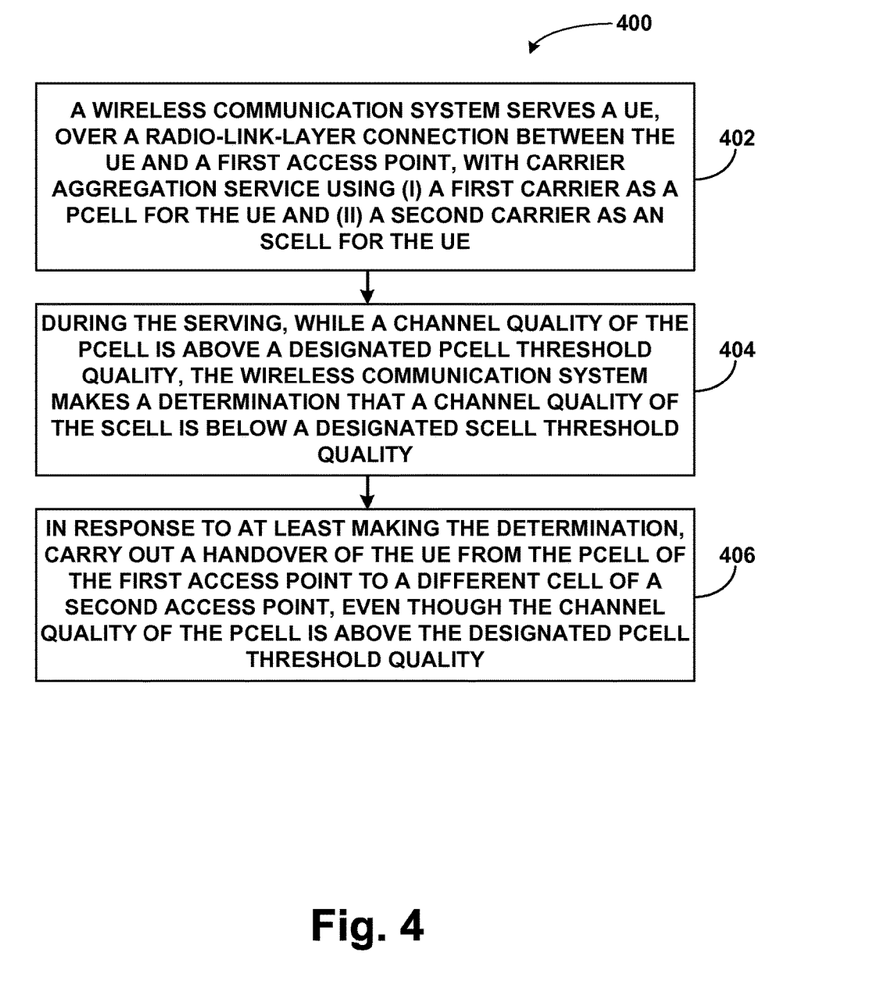
FIG. 4 is a flowchart illustrating another method to facilitate handover of a UE despite a primary carrier having a channel quality that is at or above a channel quality threshold of the primary carrier, in accordance with an example embodiment.

FIG. 4 is next a flow chart 400 depicting another example set of operations that can be carried out by a wireless communication system in an implementation of this process. In particular, this process is operable in a wireless communication system including first and second base stations. By way of example, the first and second base station could each take on one of various forms. For instance, a base station may be a macro base station, such as an eNodeB, or may be a small cell. In other examples, the present disclosure may extend to other entities of a wireless communication system, such as to Wifi access points for instance. Regardless, the first base station may (i) have an established radio-link-layer connection with a UE such that the radio-link-layer connection encompasses a first carrier and a second carrier and (ii) be configured to provide the UE with carrier aggregation service using the first and second carriers.

As shown in FIG. 4, at block 402, the wireless communication system serves the UE with the carrier aggregation service using (i) the first carrier as a PCell for the UE and (ii) the second carrier as an SCell for the UE. At block 404, during the serving, while a channel quality of the PCell is at or above a designated PCell threshold quality, the wireless communication system may make a determination that a channel quality of the SCell is below a designated SCell threshold quality. At block 406, in response to at least making the determination, the wireless communication system may carry out a handover of the UE from the PCell of the first base station to a different cell of the second base station, even though the channel quality of the PCell is at or above the designated PCell threshold quality.

Figure 5:
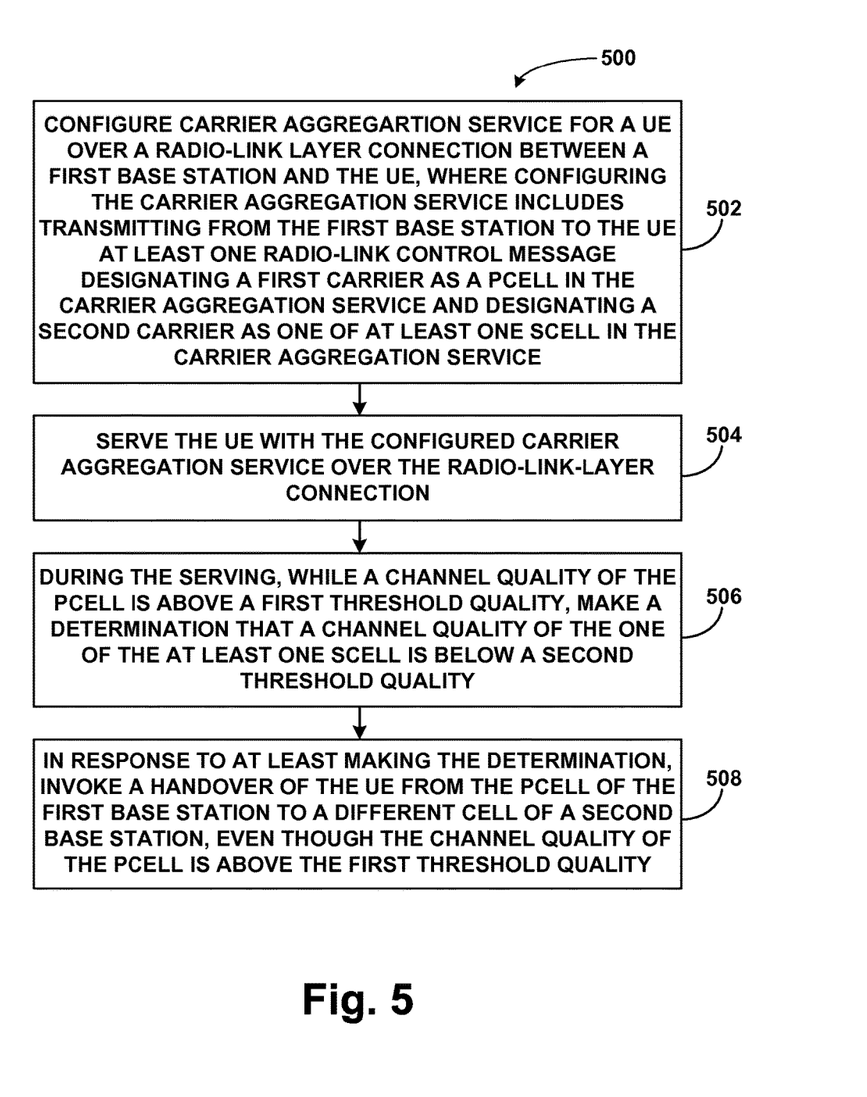
FIG. 5 is a flowchart illustrating yet another method to facilitate handover of a UE despite a primary carrier having a channel quality that is at or above a channel quality threshold of the primary carrier, in accordance with an example embodiment.

FIG. 5 is next a flow chart 500 depicting yet another example set of operations that can be carried out by a wireless communication system in an implementation of this process. In particular, this process may be operable in a wireless communication system including a first base station, a second base station, and a controller configured to perform operations such as those depicted in the flow chart 500.

As shown in FIG. 5, at block 502, the operations involve configuring carrier aggregation service for a UE over a radio-link-layer connection between the first base station and the UE. In particular, configuring the carrier aggregation service may involve transmitting from the first base station to the UE at least one radio-link control message designating a first carrier as a PCell in the carrier aggregation service and designating a second carrier as one of at least one SCell in the carrier aggregation service. Additionally, at block 504, the operations involve serving the UE with the configured carrier aggregation service over the radio-link-layer connection. Further, at block 506, the operations involve, during the serving, while a channel quality of the PCell is at or above a first threshold quality, making a determination that a channel quality of the one of the at least one SCell is below a second threshold quality. Then, at block 508, the operations involve, in response to at least making the determination, invoking a handover of the UE from the PCell of the first base station to a different cell of the second base station, even though the channel quality of the PCell is at or above the first threshold quality.

Exemplary embodiments have been described above. Those skilled in the art will understand, however, that changes and modifications may be made to these embodiments without departing from the true scope and spirit of the invention.

We claim:

1. A method operable in a wireless communication system including a first base station having an established radio-link-layer connection with a user equipment device (UE), wherein the radio-link-layer connection encompasses a first carrier and a second carrier, wherein the UE is attached with the first base station on the first carrier, and wherein the first base station has added the second carrier to the radio-link-layer connection for increased scheduling bandwidth, the method comprising:

serving the UE, by the first base station, with carrier aggregation service using the first carrier and the second carrier, wherein the serving is on the established radio-link-layer connection;

during the serving, while a channel quality of the first carrier is threshold high, the first base station making a determination that a channel quality of the second carrier is threshold low; and in response to at least making the determination, the first base station handing over the UE from being attached with the first base station on the first carrier to being attached on a carrier other than the first carrier, even though the channel quality of the first carrier is threshold high.

2. The method of claim 1, wherein the determination is a first determination, the method further comprising:

making a second determination that the channel quality of the first carrier is threshold high, wherein the first base station handing over the UE is responsive to at least making the first determination and making the second determination.

3. The method of claim 1, wherein handing over the UE comprises handing over the UE from being attached with the first base station on the first carrier to being attached with a second base station, and wherein the determination is a first determination, the method further comprising:

in response to making the first determination, making a second determination that the second base station is within a threshold distance away from the UE, wherein handing over the UE to being attached with the second base station is responsive to at least making the first determination and making the second determination.

4. The method of claim 3, further comprising:
while serving the UE, receiving a plurality of signal strength reports from the UE, wherein making the second determination comprises, based on at least one of the plurality of signal strength reports, determining that the second base station provides coverage having a respective signal strength that exceeds a threshold signal strength.

5. The method of claim 3, wherein the wireless communication system comprises data storage containing information that specifies respective locations of one or more base stations, and wherein making the second determination comprises:
determining location of the UE upon making the first determination;
determining location of the second base station by referring to the information;
based on the determined location of the UE and the determined location of the second base station, determining a distance between the UE and the second base station; and
determining that that the determined distance between the UE and the second base station is within the threshold distance.

6. The method of claim 1, further comprising:
during the serving, receiving from the UE a plurality of channel quality indicators (CQIs) each specifying a quality of at least one communication channel between the first base station and the UE; and
based on at least one of the plurality of CQIs, determining (i) the channel quality of the first carrier and (ii) the channel quality of the second carrier, wherein making the determination is based on the determined channel quality of the second carrier.

7. The method of claim 1,
wherein the determination is a first determination,
wherein the first base station radiates to define a respective coverage area,
wherein the first carrier comprises a frequency division duplex (FDD) carrier defining separate frequency channels respectively for uplink and downlink communication,
wherein the second carrier comprises a time division duplex (TDD) carrier defining a single frequency channel multiplexed over time for uplink and downlink communication, and
wherein the method further comprises:
during the serving, while the channel quality of the first carrier is threshold high, the first base station making a second determination that the UE is located within a portion of the respective coverage area at which the first base station is capable of carrying out (i) uplink and downlink communication on the FDD carrier and (ii) only downlink communication on the TDD carrier.

8. The method of claim 7,
wherein handing over the UE is responsive to at least making the first determination and making the second determination.

9. The method of claim 7,
wherein handing over the UE comprises handing over the UE from being attached with the first base station on the first carrier to being attached with a second base station,
wherein the second base station radiates to define a respective coverage area, and
wherein handing over the UE further comprises directing the UE to, after completion of the handover, remain attached with the second base station until one or more of the following occurs: (i) location of the UE is no longer within the portion of the respective coverage area of the first base station and (ii) location of the UE is no longer within the respective coverage area of the second base station.

10. The method of claim 1, wherein serving the UE comprises at least transmitting control signaling and bearer traffic between the first base station and the UE, wherein the control signaling is transmitted only on the first carrier, and wherein the bearer traffic is transmitted on one or both of the first and the second carriers.

11. The method of claim 1,
wherein the wireless communication system defines a channel quality threshold for the first carrier, wherein, when the channel quality of the first carrier is below the channel quality threshold, the first base station responsively causes the UE to scan for coverage on one or more carriers, and
wherein the channel quality of the first carrier being threshold high comprises the channel quality of the first carrier being above the channel quality threshold.

12. A wireless communication system comprising:
a first base station; and
a controller configured to perform operations comprising:
establishing a radio-link-layer connection between the first base station and a user equipment device (UE), wherein the radio-link-layer connection encompasses a first carrier and a second carrier, wherein the UE is attached with the first base station on the first carrier, wherein the second carrier is added to the radio-link-layer connection for increased scheduling bandwidth, wherein the wireless communication system defines a channel quality threshold for the first carrier, and wherein, when a channel quality of the first carrier is below the channel quality threshold, the wireless communication system responsively causes the UE to scan for coverage on one or more carriers;
serving the UE with carrier aggregation service using the first carrier and the second carrier, wherein the serving is on the established radio-link-layer connection;
during the serving, while the channel quality of the first carrier is above the channel quality threshold, making a determination that a channel quality of the second carrier is threshold low; and
in response to at least making the determination, handing over the UE from being attached with the first base station on the first carrier to being attached on a carrier other than the first carrier, even though the channel quality of the first carrier is above the channel quality threshold.

* * * * *